Figure 1:
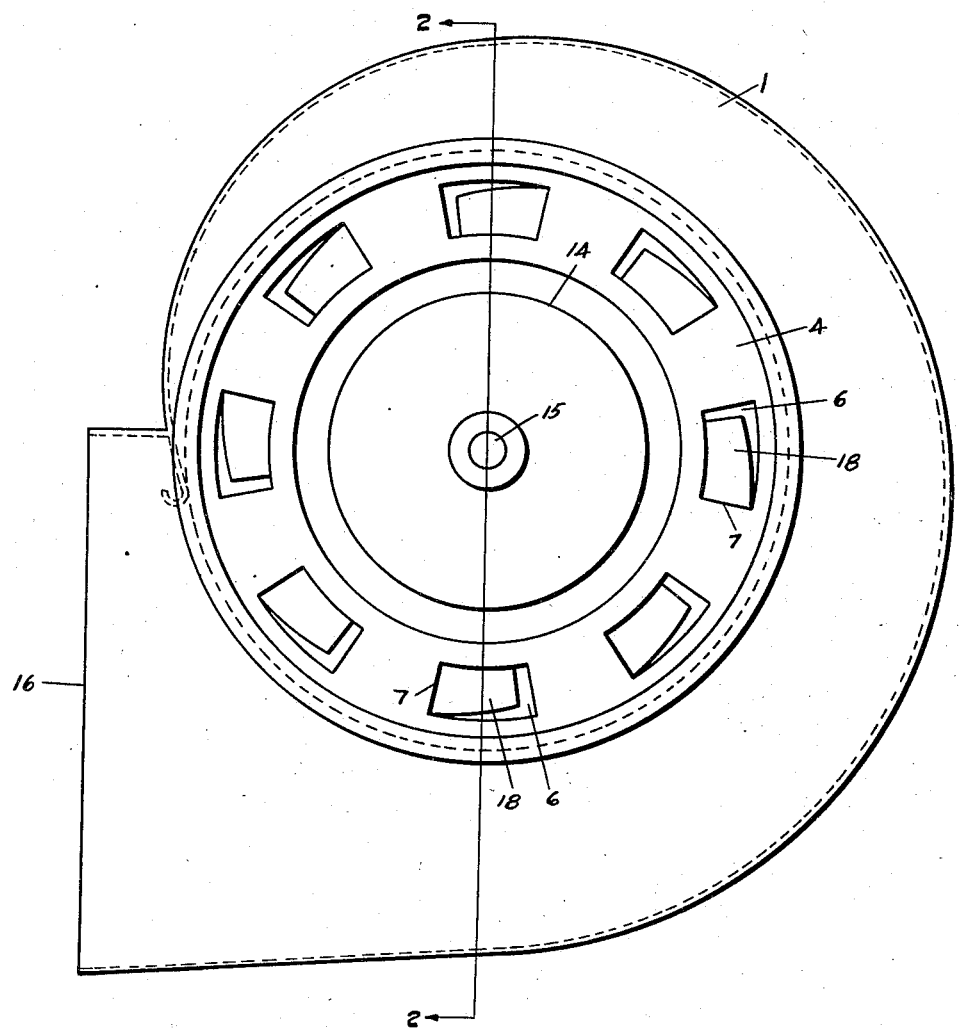

Jan. 6, 1931.  E. L. ANDERSON  1,787,655
APPARATUS AND METHOD OF CONTROLLING FANS
Filed May 18, 1929  2 Sheets-Sheet 1

INVENTOR
EDWARD L. ANDERSON.
BY Toulmin + Toulmin
ATTORNEYS

INVENTOR
EDWARD L. ANDERSON.
BY Toulmin & Toulmin
ATTORNEYS

Patented Jan. 6, 1931

1,787,655

UNITED STATES PATENT OFFICE

EDWARD L. ANDERSON, OF GROSSE ILE, MICHIGAN, ASSIGNOR TO AMERICAN BLOWER CORPORATION, OF DETROIT, MICHIGAN, A CORPORATION OF DELAWARE

APPARATUS AND METHOD OF CONTROLLING FANS

Application filed May 18, 1929. Serial No. 364,290.

My invention relates to blowers.

It is a primary function of my invention to provide re-circulating louvers in an inlet cone for the purpose of causing jets of air to be returned from the housing into the cone of the inlet tangentially of the incoming air stream in order to give to the incoming air stream rotary motion in the direction of the fan wheel rotation, thus reducing the static pressure of the fan at constant speed with the consequent reduction in horse power.

It is my particular object to provide a high speed fan in which back pressure will be utilized to induce the flow of air that is incoming over the entire fan blade surface. It is my object to prevent back pressure from creating a dead area over a portion of the fan and reducing its effectiveness.

It is a further object of my invention to provide means in combination with this back pressure air inducing means of providing a rotary movement of the air in the casing to supplement and cooperate with the rotary movement of the air leaving the fan, to induce air flow, and to create smoothness of operation.

It is my object to provide means for diverting a portion of the incoming air stream to leave the stream and create an induced fan casing suction to facilitate the drawing of the remainder of the incoming air over the fan blades.

It is my further object to provide such means that in the event the back pressure balances or exceeds the incoming air pressure, that this back pressure will be relieved into the inlet opening in a rotary direction to facilitate the incoming air and to impart to it rotary motion.

Referring to the drawings, Figure 1 is a front elevation of the fan.

Figure 2:
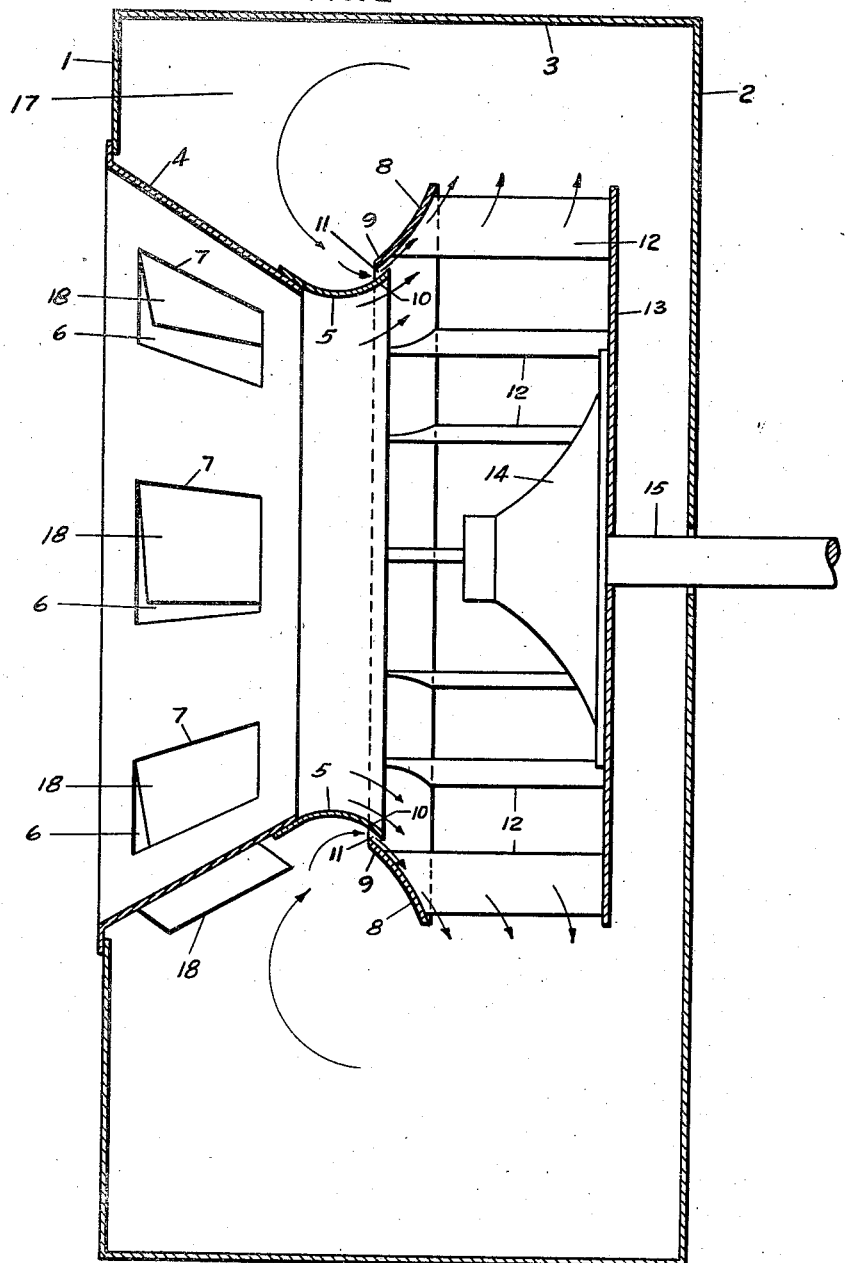

Figure 2 is a section on the line 2—2 of Figure 1.

Referring to the drawings in detail, the casing of the fan is comprised of a front wall 1, and a rear wall 2, which walls adjoin together by a continuous scroll end wall 3.

This casing is provided with an inlet tube 4 which provides a constricting Venturi mouth arcuate in section on the inside of the casing. Such mouth is designated 5.

The inlet tube wall, which is tapered as at 4, is provided with a plurality of openings 6, which are formed by cutting away three sides of a rectangular portion of the metal in the tube 4, bending it inwardly along the fourth side as at 7. This forms a series of radially disposed guide vanes and scoops for purposes hereinafter described. The flaring tubular mouth 5 is surrounded by a shroud on its inner edge, such shroud also being arcuate in cross section. This shroud is designated 8.

It is provided with an overlapping portion 9 that overlaps the inlet tube margin 10.

There is a space 11 between these two members thru which back pressure air flows, as indicated by the arrows, in a line parallel to the incoming air, thus providing an induced flow for the incoming air so that it will pass over the fan blades 12 on the inlet side thereof to insure a distribution of the air throughout the length of the blades. Heretofore, any leakage at this point moved across the incoming air, creating a dead area on the inletside of the blades.

The blades are supported on their other sides from the shroud by the disc 13 which is mounted upon the hub 14 that in turn is carried by the fan shaft 15.

In operation the air enters the passage way formed by the constricted tubular member 4, is induced to enter by the flow of air through the passage way 11 and then flows over the fan blades and is forced out of the casing thru the outlet opening 16.

As this air must be converted from axial into rotary movement, it is desirable that the incoming air have as great a rotary movement as possible. When the air is of higher pressure than the back pressure of the air in the general area designated 17, a portion of the incoming air will tend to pass thru the opening 6, by reason of impinging upon the blades which are bent inwardly, as at 18, a rotary movement will be imparted to the air in the dead area 17, inducing it to move and to flow in harmony with the air which is being driven by the fan elsewhere.

If the back pressure is greater than the inlet pressure, air may flow out of the opening 6 with a rotary movement joining with the incoming air, and in giving to that incoming air an additional rotary movement preparatory to its final rotary movement within the casing on such movement, contribute to the general efficiency of this blower.

One of the principal features of the invention is the location of the guide vanes within the main casing 1 or so-called fan casing. By "casing" or "fan casing" in the claims it will be understood that I am referring to the main casing in which the fan rotates, and I do not include within that term any casings attached to the main casing 1 in which the fan does not rotate.

I desire to comprehend within my invention such modifications as may be clearly embraced within my claims and the scope of my invention.

Having thus fully described my invention what I claim is new and desire to secure by Letters Patent, is:

1. In a blower, a casing, a fan, an inlet passage way extending into the casing and having a plurality of ports and a guide blade adjacent each of said ports extending within the fan casing.

2. In a blower, a casing, a fan, an inlet passage way extending into the casing and having a plurality of ports and a guide blade adjacent each of said ports, said passage way being of decreasing diameter as it progresses into the fan casing.

3. In a blower, a casing, a fan, an inlet passage way extending into the casing and having a plurality of ports and a guide blade adjacent each of said ports, said passage way being of decreasing diameter as it progresses into the fan casing, a flaring mouth on the inlet end of said passage way.

4. In a blower, a casing, a fan, an inlet passage way extending into the casing and having a plurality of ports and a guide blade adjacent each of said ports, said passage way being of decreasing diameter as it progresses into the fan casing, a flaring mouth on the inlet end of said passage way projecting into the interior of the fan.

5. In a blower, a casing, a fan, an inlet passage way having a plurality of ports and a guide blade adjacent each of said ports, said passage way being of decreasing diameter as it progresses into the fan casing, a flaring mouth on the inlet end of said passage way projecting into the interior of the fan, an overlapping shroud on said fan spaced from said mouth where the mouth and shroud overlap.

6. In combination, a blower of a casing, a fan therein, spaced from one wall thereof, an inwardly directing Venturi passage way extending from one wall to the fan and a plurality of guide vanes tangentially disposed to the surface of said passage way and extending inwardly into the fan casing.

7. In combination, a blower of a casing, a fan therein, spaced from one wall thereof, an inwardly directing Venturi passage way extending from one wall to the fan and a plurality of guide vanes tangentially disposed to the surface of said passage way and extending inwardly into the fan casing, a shroud on said fan overlapping the inner end of said passage way, but spaced therefrom, forming a back pressure passage way for reentry of the back pressure air into the fan parallel to the incoming air stream.

8. In a blower, a casing, a fan having a side inlet and radial delivery of air, a plurality of fan blades whose longitudinal axes are parallel to the axis of inlet to the fan, an inlet passage way leading from the outer wall of the casing to the fan, and means associated with said passage way for inducing rotary movement of the air in cooperation with the rotary movement as impelled by the fan radially therefrom, said means extending from the passageway into the casing of the fan in which the fan is rotating.

9. In combination in a blower, a scroll casing, a side inlet radial delivery high speed fan eccentrically located in said scroll casing having the greater distance between its periphery and the casing adjacent the outer opening of the casing, an inlet passage way leading from one side of the casing to the inlet of the fan, and means associated with said inlet passage way for inducing rotary movement of the air supplementary to that caused by the fan, said means extending from the passageway into the casing of the fan in which the fan is rotating.

10. In combination in a blower, a scroll casing, a side inlet radial delivery high speed fan eccentrically located in said scroll casing having the greater distance between its periphery and the casing adjacent the outer opening of the casing, an inlet passage way leading from one side of the casing to the inlet of the fan, and means associated with said inlet passage way for inducing rotary movement of the air supplementary to that caused by the fan, said means extending from the passageway into the casing of the fan in which the fan is rotating, and means for utilizing back pressure air in the fan casing for inducing the flow of incoming air having the supplementary rotary movement to flow evenly over all parts of the fan.

11. In a blower, a fan casing, an inlet passage way, a side wall having openings forming an inlet passage way, a fan and tangential wings inwardly disposed from the inlet passage way towards the interior of the fan casing adjacent side wall openings in the inlet passage way.

12. In combination, a fan casing, a fan member rotating in a predetermined direction, an inlet passageway in said casing, and means associated therewith for direction of the air inside the casing into said passageway tangentially thereof to impart a rotary movement to the incoming air in the same direction as the rotation of the fan.

13. In a blower, a fan casing, a Venturi-shaped inlet passageway projecting into said casing, the walls of said passageway having a plurality of openings therein, and a tangential blade for each opening integral with the walls of the passageway.

In testimony whereof, I affix my signature.

EDWARD L. ANDERSON.